United States Patent Office 3,518,233
Patented June 30, 1970

---

3,518,233
ARYLENE SULFIMIDE POLYMERS
Gaetano F. D'Alelio, South Bend, Ind., assignor to the United States of America as represented by the Secretary of the Air Force
No Drawing. Filed Sept. 15, 1967, Ser. No. 668,255
Int. Cl. C08g 20/00
U.S. Cl. 260—78                  15 Claims

ABSTRACT OF THE DISCLOSURE

This invention comprises new polymers of polyarylene sulfimides which can be classified as polysaccharins and polyarylenedisulfonimides. These polymers are represented by the formula

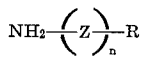

wherein Z represents one or more of the repeating units:

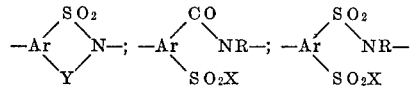

wherein Ar represents a polyvalent aromatic radical; R is hydrogen or a hydrocarbon radical; Y represents $>C=O$ or $>SO_2$; X represents OR, NHR, or halogen; and $n$ is at least 2. These polymers are prepared by the condensation polymerization of monomeric aromatic compounds having a condensible amino group and two functional groups condensible with the amino group, one of these functional groups being a sulfonic radical and the other being either a sulfonic or a carboxylic radical. These new polymers have very good resistance to high temperatures, for example up to 500–600° C., and in some cases even as high as 1000° C. and are useful in preparing laminates, adhesives, fibers, and molding compositions, particularly where such materials are required to stand high temperatures such as in aerospace flight.

---

The invention described herein may be manufactured and used by or for the United States Government for governmental purposes without payment to us of any royalty thereon.

CROSS-REFERENCE TO RELATED APPLICATIONS

The following copending applications have been filed on the same date herewith: application Ser. No. 668,254 hereinafter referred to as "Arylene Sulfimide Polymers"; application Ser. No. 668,753 hereinafter referred to as "Tetrafunctional Aromatic Sulfonic Compounds; application Ser. No. 668,257 hereinafter referred to as Arylene Sulfimide Polymers.

BACKGROUND OF THE INVENTION

Field of the invention

This invention relates to new polymers comprising polymeric aryl sulfimides. More specifically, it relates to polymers which can be classified as polysaccharins and polyarylenedisulfonimides.

Description of the prior art

There has always been a great interest in developing organic polymers of high heat resistance. Obviously, the decomposition, discoloration, charring, loss of weight, and even combustion resulting upon exposure of organic materials, including organic polymers to high temperatures has been a drawback in the use of such materials. Therefore, in spite of the various advantages of using organic polymers, such as availability, ease in fabrication, weight and in many cases economics, there is a limitation on the use of organic polymers where high temperatures are likely to be encountered.

SUMMARY OF THE INVENTION

In accordance with the present invention, a new series of polymers has been found which are capable of withstanding extremely high temperatures, namely up to 500–600° C. and in some cases even as high as 1000° C. These new polymers are condensation polymers of monomeric, aromatic compounds having an amino radical and also containing two functional groups ortho in position to each other and capable of ultimately condensing with an amino group to form a sulfimide ring. In each case, one of the functional groups is a sulfonic radical and the second functional group is either a carboxylic or a sulfonic group.

These polymers are prepared by the condensation polymerization of monomeric aromatic compounds having a condensible amino group and two functional groups condensible with the amino group, one of these functional groups being a sulfonic radical and the other being either a sulfonic or a carboxylic radical. These two functional groups can also already exist in condensed forms such as anhydride or imide or other derivative forms as described herein.

The polymers of this invention can be represented by the formula

(Formula I)

wherein Z represents one or more of the following repeating units

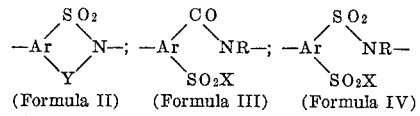

(Formula II)   (Formula III)   (Formula IV)

wherein Ar represents a polyvalent aromatic radical as described more fully hereinafter;

R is hydrogen or a hydrocarbon radical, advantageously of no more than 10 carbon atoms, and preferably hydrogen;

Y represents $>C=O$ or $>SO_2$;

X represents OR, NHR or halogen, such as Cl or Br; and $n$ is an integer having a value of at least 2, preferably at least 4.

The polymers of this invention can also be represented as having one of the following formulas:

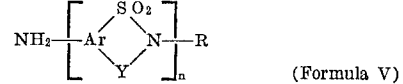

(Formula V)

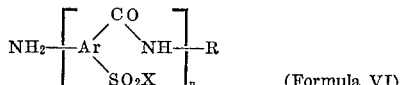

(Formula VI)

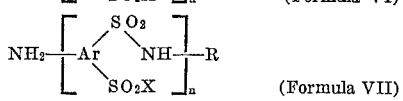

(Formula VII)

When the second functional group is carboxylic, the resultant ultimate polymer is a polysaccharine having the repeating unit

(Formula VIII)

When the second functional group is sulfonic, the resultant ultimate polymer is a polydisulfimide having the repeating unit

(Formula IX)

As an intermediate prior ot the formation of the above ultimate forms, hemi-polymers are also prepared having one of the repeating units

(Formula III)

or

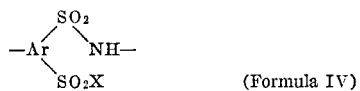
(Formula IV)

In preparing the polysaccharine type of polymer, the starting monomer is an aromatic compound which has a sulfonic group and a carboxylic group ortho to each other and an amino (—$NH_2$) group also attached to the aromatic nucleus. The sulfonic and the carboxylic groups can be in the acid form or in a derivative form such as ester, amide, anhydride, imide, acid halide or other form which is easily condensible with the aforementioned amino group attached directly to the aromatic nucleus and the ester, amide, etc. groups are displaced during the condensation reaction.

Likewise the polydisulfonimide type of polymer is prepared by using similar monomeric materials having a second sulfonic acid group replacing the carboxylic group in the saccharine type of monomer. In this case also, the various derivative groups indicated above can be present in the starting compound provided they do not interfere with the condensation in either the preliminary hemi-polymer formation or in completing the cyclic structure of the polymer.

Upon initial condensation, only one of the functional groups condenses with the amino group so as to form hemi-polymers which have the repeating unit structure such as shown above in Formulas III and IV. Upon further heating, the condensation with the second functional group is effected so as to produce the cyclic structure in the repeating unit shown in Formula II.

When a saccharine type monomer is used, the initial condensation of the amino group is with the carboxy group and the ultimate cyclization in the repeating structure is completed through the sulfonic group.

The Ar radical is preferably a benzene nucleus but it can have a naphthalene, diphenyl, diphenyl oxide, diphenylamine, diphenylsulfide, diphenylketone, diphenylsulfone, diphenylsulfoxide, diphenylmethane, etc. nuclear structure and can have various substituent groups therein such as various hydrocarbon radicals, such as suitable for R, namely alkyl, alkenyl, aryl, alkaryl, aralkyl, cycloalkyl, cycloalkenyl, including as typical examples methyl, ethyl, propyl, butyl, hexyl, decyl, phenyl, tolyl, naphthyl, methylnaphthyl, ethylnaphthyl, diphenyl, xylyl, cyclohexyl, cyclopentyl, cyclohexenyl, methylcyclohexyl, methylcyclohexenyl, vinyl, allyl, hexenyl, octenyl, ethylphenyl, vinylphenyl, allylphenyl, etc.; and also chlorophenyl, bromophenyl, fluorophenyl, iodophenyl, trifluoromethyl, etc.; and also halogen atoms, such as chloro, bromo, iodo, fluoro, cyano, etc. Advantageously there are no more than 20 carbon atoms in such groups, preferably no more than about ten, particularly in the R group.

Numerous other types of radicals can be present, as previously indicated, provided they do not interfere with the condensation reaction or produce undesirable properties in the resultant polymer. Obviously, the undesirable properties will be determined in accordance with the ultimate use of the polymer. For example, if a derivative group is not capable per se of withstanding high temperatures, the presence of such a group in a polymer ultimately to be used for heat resistance purposes will not be satisfactory. However, for certain other uses where this particular group imparts a desirable property and the ultimate polymer is not to be used where heat resistance is required, then even such groups can be present. It is intended that the scope of the invention include polymers having such a variety of derivative groups. However, for most purposes, the simpler types of structures specifically disclosed herein are preferred. Moreover, while many groups included within the definition, such as acetylenic, spiro, cyclopentadienyl, butadienyl, etc., may be impractical, they are operable and are included in the broad scope of the invention.

Various typical monomeric materials that can be used in preparing the polymers of this invention are illustrated by but not limited to the following: 5-aminosaccharin, 6-aminosaccharin, (the 4- and 7-aminosaccharins are more difficult to prepare but nevertheless can be used), the derivatives of the various aminosaccharins in which the hydrogen or the nitrogen of the heterocyclic ring has been replaced by methyl, butyl, phenyl, cyclohexyl, allyl, etc., 2-sulfo-4-amino-benzoic acid and its anhydride, acidamides, diamide, acid halides, such as the diacid chloride, and various esters such as the diethyl, dimethyl, diamyl, diphenyl, diallyl, dicyclohexyl, etc., 2-sulfo-5-aminobenzoic acid and its corresponding derivatives as listed above for the sulfo-amino-benzoic acids, 3-sulfo-5-amino-beta-naphthoic acid and its corresponding derivatives; including the cyclicamide; 5-amino-1,2-naphthalene-disulfonic acid, and its anhydride, acid halides, acidamides, diamide, and various esters such as dimethyl, diphenyl, dicyclohexyl, etc., 6-amino-2,3-naphthalene disulfonic acid and its various corresponding derivatives; 4-carboxy-3-sulfonic-4'-aminodiphenyl and its cyclicamide anhydride, acids, diamide, acid halides and various esters; and less desirable but suitable for many purposes are the 4-carboxy-3-sulfonic-4'-amino-diphenyl oxides, and the cyclic amide anhydride, acid amides, diamide, acid halides, and esters thereof; 4-carboxy - 3 - sulfonic-4'-amino-diphenyl amine, 4-carboxy - 4 - sulfonic-4'-amino-diphenyl sulfide, 3,4-disulfonic-4'-amino-diphenyl oxides, and the cyclic amide anhydride, acid amides, diamide, acid halides, and esters thereof, 3,4-disulfonic-4'-amino-diphenyl amine, 3,4-disulfonic-4'-aminodiphenyl sulfides.

In addition to melt polymerization, the polymerizations of this invention can be conducted in an activating medium, such as a triethylamine-water system, dimethylformamide, dimethylsulfoxide, butyrolactone, polyphosphoric acid and dimethylacetamide. The temperature and the time of heating can be varied according to the type of polymer and the degree of polymerization desired. The hemi-polymers are generally soluble in dimethylacetamide, but the solubility decreases as the heating is continued and more of the repeating units are thereby converted to the cyclic structure. Final ring closures in the polymers occur in the range of 400–500° C.

Generally the polymers are not completely of the closed ring type and there is usually at least a small amount of the open type structure, as shown in Formula XIII or X. Generally, as the polymerization progresses, the ratio of $n''$ to $n'$, such as in Formula XIII keeps increasing until there are very few repeating units of the open structure so that $n'$ becomes relatively small.

Moreover, in formulas, such as Formula X and Formula XIII, where two types of repeating units are indicated and subscripts $n'$ and $n''$ are used to indicate the number of such units, it is not intended that these formulas represent block copolymers. Instead, the two types of repeating units are distributed at random along the polymer chain and the similar repeating units are grouped within the brackets merely to indicate the number of such repeating units.

The monomeric compounds described herein as suitable for the practice of this invention can be represented by the formula

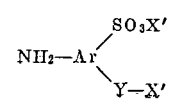

wherein Y is >C=O or >SO₂; Ar is trivalent aromatic radical, preferably hydrocarbon; X' is OR, Cl, Br, NHR, ONa or 2 X's can represent —O— or —NR—; and R is hydrogen or a hydrocarbon radical advantageously of no more than 20, preferably no more than 10 carbon atoms.

The polymerizations of the saccharine type of monomers are best conducted in the presence of a tertiary amine, such as triethylamine, tripropylamine, triphenylamine, tricyclohexylamine, etc. Such tertiary amines apparently catalyze the transamidation or replacement of the nitrogen originally attached to the caboxy group of the saccharine heterocyclic ring with the nitrogen of the amino group attached to the aromatic nucleus. The heterocyclic ring is thereby opened with he original nitrogen remaining attached to the sulfur until the ring is subsequently reclosed and the nitrogen attached to the sulfur being thereby completely eliminated.

The polymerizations can be conducted in any suitable equipment adapted to produce the conditions required. In most cases in the examples described hereinafter, the polymerization vessel is merely a glass tube or glass flask in which the required atmospheric conditions and the desired temperatures are maintained.

For determination of the thermal properties of the polymers, a 950 Thermogravimetric Analyzer marketed by Du Pont is used in conjunction with a 900 Differential Analyzer. A heating rate of 15° per minute is used and a number of Thermogravimetric measurements are made in nitrogen and in air at a flow rate of 0.5 standard liter per minute.

As previously indicated, the time of condensations can be varied in accordance with the type of product desired. The longer the heating period, the higher the degree of polymerization and the resultant molecular weight and ring closure. The effect of these factors is illustrated in the examples below.

In addition to the various methods of preparing the monomeric materials illustrated hereinafter in the examples, various other methods can be used which give the desired structures. Generally the starting material is selected to give the amine group in a desired position with respect to the two ortho-functional groups. In some cases, however, such as in double ring systems, such as naphthalene and diphenyl, the exact position of the amino group with respect to the ring-forming groups is of less importance than with regard to benzene compounds.

As previously indicated the polymer products of this invention are useful for many purposes particularly where heat resistance is desired. They may be used in preparing laminates, adhesives, fibers, molding compositions, etc. Upon curing these compositions become completely insoluble in common and extraordinary solvents. The hemi-polymers or low molecular weight polymers can be dissolved or softened by solvents for various spinning, or shaping operations and cured after fabrication. When cured at 350° C. or higher any substrate material used with the polymer must be likewise capable of withstanding high temperature. Fibers made from these materials can be made into heat-resistant fabrics suitable for aerospace purposes, such as parachutes, speed-breaking parachutes, etc. where heat is likely to be generated.

DESCRIPTION OF PREFERRED EMBODIMENTS

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

The following Examples I–III show the steps in a preferred method for preparation of 6-aminosaccharin starting with 2-methyl-5-nitroaniline, preparing the various intermediates and then in Example III the 6-aminosaccharin. Example IV shows the conversion to the trimethyl ammonium form which is particularly susceptible to polymerization. Other amino-aromatic monomeric compounds used in this invention can also be prepared by using these procedures with appropriate variations made in the starting material, reagents and proportions.

Examples V–VII show the various steps in preparing 3-nitrosulfobenzoic anhydride which is another monomeric compound that can be used in preparing the polymers of this invention.

Examples VIII–XIII show various procedures for first effecting polymerization of 6-aminosaccharin, first catalyzed by triethylamine, then by melt polymerization, and then in the presence of polyphosphoric acid.

Example XIV shows the polymerization of 4-NH₂-sulfobenzoic anhydride.

Examples XV–XVII show post heating of the polymers to effect additional ring closures. Some of the weight loss reported is the escape of gas due to elimination of condensation ammonia or water eliminated by the ring closure. Then if the temperature is increased beyond the decomposition point the loss in weight is due to degradation.

When the saccharine type of polymers are post heated for prolonged periods, pseudosaccharine types of polymers can be derived whereby the oxygen of the carboxy group is eliminated to give a >C=N-type of ring structure. Such pseudosaccharin or "thiazone" polymers are disclosed more fully and covered in a copending application filed the same date herewith.

Examples XVIII and XIX show the preparation and polymerization of 4-amino-1,2-benzenedisulfonyl anhydride.

Example XX shows preparation and polymerization of naphthalene and diphenyl amino-disulfonic anhydride derivatives.

Example XXI shows the preparation and polymerization of 5-aminosaccharin; and

Example XXII shows the polymerization of a variety of monomeric compounds.

In order to facilitate an understanding of the preparations and structural changes described in the following examples, the steps and structural formulas are presented schematically as follows:

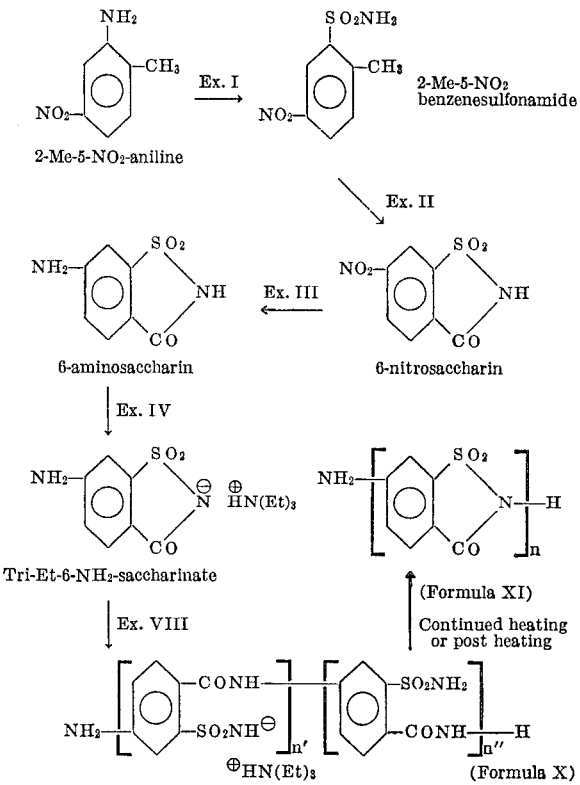

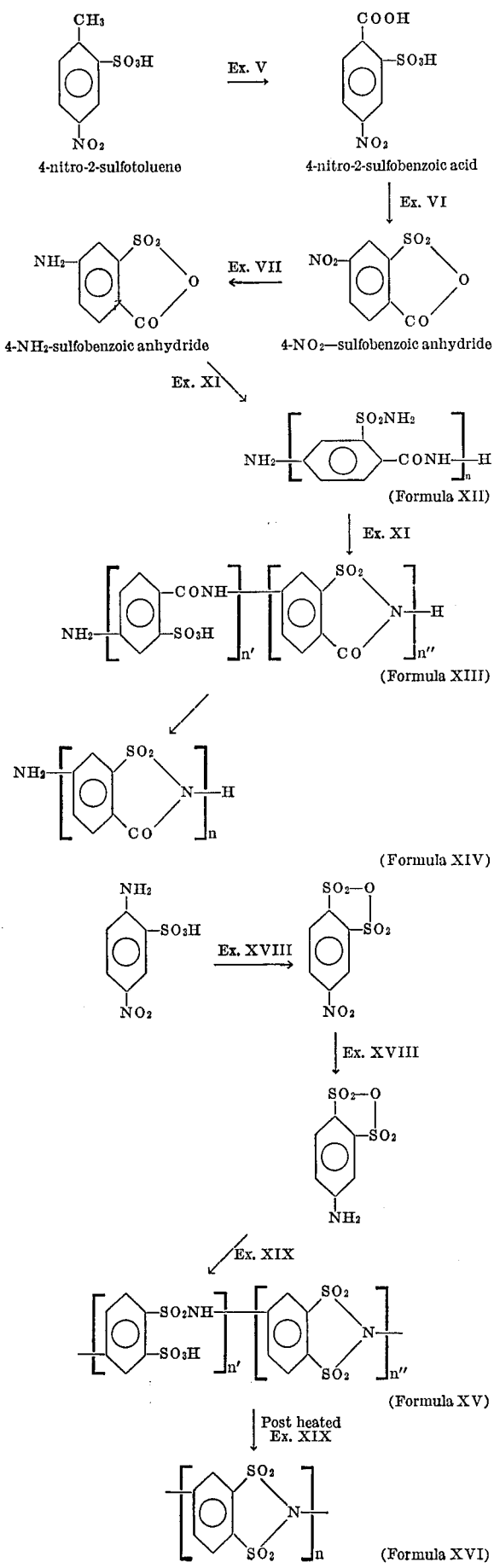

EXAMPLE I

Synthesis of 2-methyl-5-nitrobenzenesulfonamide

In a typical experiment, 2-methyl-5-nitroaniline (152 g., 1.0 mole) and hydrochloric acid (340 ml., 12 N) are placed in a two-liter flask equipped with stirrer, etc., and cooled to about 0° C. A solution of sodium nitrate (75 g., 1.09 moles) in water (280 ml.) is added, with vigorous stirring, at a rate such that the temperature of the reacting mixture remains below 5° C. After the addition is completed, the mixture is stirred for thirty minutes, filtered, and the residue discarded. The filtrate is added to a vigorously stirred solution previously made by adding aqueous copper (II) chloride (40 g. of cuprous chloride in 36 ml. of water) to acetic acid (800 ml.) saturated with the sulfur dioxide. A vigorous reaction occurs with the evolution of nitrogen and the formation of an oil layer. After stirring for forty-five minutes, the oil is isolated by means of a separatory funnel and collected.

The oil is added to a 500-ml. beaker containing ammonium hydroxide (140 ml., 15 N) and water (140 ml.). This mixture is heated in a steam bath for thirty minutes and acidified with sulfuric acid (6 N). A white solid precipitates and is removed by filtration. The product is recrystallized from water and dried vacuo. There is obtained 195 g. (90%) of a white crystalline solid, melting point 185–187° C. (The literature reports 2-methyl-5-nitro-benzenesulfonamide as melting at 186°–187° C.)

EXAMPLE II

Oxidation of 2-methyl-5-nitrobenzenesulfonamide to 6-nitrosaccharin

Water (21.0 g.), sulfuric acid (57.6 g., Sp. Gr.=1.84) and sodium dichromate (30.0 g., 0.1 mole, 0.6 eq.) are placed in a one-liter three-neck round-bottom flask equipped with a reflux condenser, a mechanical stirrer and a dropping funnel. Pure 2-methyl-5-nitrobenzene-sulfonamide (17.0 g., 0.686 mole, 0.48 eq.) is added and the flask is placed into a water bath at 54° C. Stirring is started and sulfuric acid (51.0 g., Sp. Gr.=1.84) is added slowly from the dropping funnel. After the addition of sulfuric acid is completed, the green mixture is stirred for forty-five minutes before pouring it onto crushed ice (500 g.). A white solid precipitates and is removed by filtration.

This procedure is repeated using additional 2-methyl-5-nitrobenzenesulfonamide (17.0 g., 0.86 mole, 0.48 eq.). The combined products are dissolved in aqueous sodium carbonate (150 ml. 0.3 M). The carbonate solution is filtered and the filtrate acidified with sulfuric acid (6 N). A cream-colored solid precipitates and is removed by filtration and dried. There is obtained 28.5 g. (80%) of a cream-colored solid, melting pont 209–211° C. (The literature reports 6-nitrosaccharin as melting at 206–209° C.)

EXAMPLE III

Hydrogenation of 6-nitrosaccharin to 6-aminosaccharin 6-nitrosaccharin (10.0 g., 0.044 mole), 5% palladium-on-charcoal (1.0 g.) and absolute ethanol (250 ml.) are placed in a Parr bottle. The bottle is placed in the Parr apparatus, flushed three times with hydrogen and filled with hydrogen to a pressure of 42 p.s.i.g. The mixture is agitated for fifteen to thirty minutes, during which time the pressure drops to about 32 p.s.i.g. The bottle is again filled with hydrogen (42 p.s.i.g.) and agitation continued for thirty minutes. Then, the catalyt is removed by filtration and the filtrate evaporated to dryness in vacuo. The solid residue is recrystallized from ethanol and dried. There is obtained 8.2 g. (93%) of a light-yellow solid, melting point 291–293° C. (The literature reports 6-aminosaccharin as melting at 283–285° C.)

The intrinsic viscosity of 6-aminosaccharin in dimethylformamide at 20° C. is found to be 0.002 dl./g.

EXAMPLE IV

Preparation of triethylammonium 6-aminosaccharinate 6-aminosaccharin (1.0 g., 0.005 mole) is dissolved in a mixture of benzene (100 ml.) and ethanol (100 ml.). Triethylamine (0.5 g., 0.05 mole) is added, and the solvent is evaporated in vacuo. There is obtained 1.3 g. (87%) of a cream-colored solid, melting point 177–180° C. The sample is polymerized by raising the temperature above the melting point.

*Analysis.*—Calculated for $C_{13}H_{21}N_3SO_3$ (percent): C, 52.15; H, 7.07; N, 14.04. Found (percent): C, 52.61; H, 6.97; N, 13.68.

EXAMPLE V 2-nitro-2-sulfobenzoic acid

A mixture of 30.0 g. (0.05 mole) of sodium dichromate, 31.3 ml. concentrated sulfuric acid and 21 ml. water are placed in a two-liter, three-neck flask equipped with a condenser and a mechanical stirrer. The reaction vessel is immersed in a 50° C. water bath and 17.0 g. (0.076 moles) of 4-nitrotoluene-2-sulfonic acid is introduced in three portions. With vigorous stirring, 55 ml. of concentrated sulfuric acid is added slowly. A vigorous reaction occurs when about 50% of the concentrated sulfric acid has been added. The resulting clear green reaction mixture is stirred at 50° C. for three hours. The reaction mixture is then quenched in 200 g. of ice and a clear dark-green solution is obtained which is cooled in a refrigerator overnight and greenish-white needles separate out. The solid is removed by filtering through a sintered glass filter. There is obtained a slightly greenish-white solid, which melts partly at 138–140° C. and partly at 215–220° C. This greenish-white solid is dissolved in a minimum amount of concentrated sulfuric acid and then quenched in ice to give a white solid in 45% yield (8.68 g.), melting point 138–140° C. Its infrared spectrum in Nujol shows an intense carboxyl carbonyl absorption at 1730 cm.$^{-1}$.

EXAMPLE VI

Preparation of 4-nitro-sulfobenzoic anhydride (a) *By the action of acetic anhydride.*—The nitrodiacid prepared in Example V (2.0 g., 0.008 mole) is refluxed with 12 ml. (0.12 mole) of acetic anhydride in a 50 ml. round-bottom flask. The reaction mixture gradually turns dark brown in color. After refluxing for two hours, the excess acetic anhydride is removed under reduced pressure. The resulting brown residue is recrystallized from benzene to give a yellow solid in 70% yield (1.5 g.), melting point 108–110° C. After recrystallization from benzene, the light-yellow solid melts at 110–112° C. Its infrared spectrum shows an intense anhydride carbonyl absorption at 1820 cm.$^{-1}$ and it has a neutralization equivalent of 1.92 (calculated value 2.0).

(b) *By the action of thionyl chloride.*—The nitrodiacid of Example V (3.0 g., 0.012 mole) is refluxed in a 100 ml. round-bottom flask with 30 ml. (0.42 mole) of thionyl chloride for five hours. The resulting clear yellow solution is quenched with ice and an insoluble white solid is removed by filtration. The solid, melting at 113–115° C. is obtained in 83.5% yield (2.3 g.). After recrystallization from benzene the solid melts at 115–117° C.

EXAMPLE VII

Hydrogenation of 4-nitrosulfobenzoic anhydride to 4-$NH_2$-sulfobenzoic anhydride Recrystallized nitroanhydride of Example VI (2.06 g., 0.009 mole) in 15 ml. of dimethylacetamide is hydrogenated in the presence of 516 mg. of 5% palladium-on-charcoal at 40 p.s.i.g. hydrogen pressure. In a few minutes about one p.s.i.g. of hydrogen pressure is absorbed by the reaction mixture. After one hour, an additional 167 mg. of the catalyst is introduced and the hydrogenation is continued for another hour. In about fifteen minutes, one p.s.i.g. of hydrogen pressure drop is noted. The catalyst is removed by filtration.

A one-ml. portion of the greenish-yellow filtrate (a) is quenched in ice and the solution is stored in the refrigerator overnight. A white solid separates. The solid is found to have a neutralization equivalent of 1.96 on the basis of 4-nitro-2-sulfobenzoic acid·$2H_2O$ (calculated value 2.0), and its infrared spectrum in potassium bromide shows an intense carboxyl carbonyl band at 1720 cm.$^{-1}$ and $SO_3H$ absorptions at 1240 cm.$^{-1}$ and 1080 cm.$^{-1}$. The $NH_2$ absorption at 2900–3100 cm.$^{-1}$ region is not sharp. There are no $NO_2$ absorptions present at 1530 cm.$^{-1}$ and 1340 cm.$^{-1}$. The white solid appears to be impure 4-aminosulfobenzoic acid. On addition of 15 ml. of benzene to a one-ml. portion of the filtrate (a), a greenish oil separates. However, on addition of 30 ml. of dry acetone to one ml. portion of the filtrate (a), there precipitates a yellow solid (b) which melts partly at 120° C. to 155° C. and finally completely at 210° C. Titration of a portion of the solid indicates that it is a mixture of dimeric or trimeric compounds.

The infrared spectrum of the solid (b) in potassium bromide shows an intense amide N-H absorption at 3300 cm.$^{-1}$, a broad band due to amide I(C=O) and amide II absorptions around 1650–1580 cm.$^{-1}$, a broad $SO_3H$ absorption at 1230 cm.$^{-1}$ and 1080 cm.$^{-1}$, and a broad $SO_2N$ absorption at 1160 cm.$^{-1}$. The secondary amide NH out-of-plane deformation at 708 cm.$^{-1}$ (amide V) is also present.

EXAMPLE VIII

Polymerization of 6-aminosaccharin in the presence of triethylamine 6-aminosaccharin (2.00 g., 0.155 mole), triethylamine (1.813 g., 0.00804 mole) and water (2.80 g., 0.155 mole) are placed in a polymerization tube. The tube is flushed with nitrogen. During polymerization the effluent gas is passed through a trap containing 150 ml. of 0.0943 N sulfuric acid. The contents of the tube are refluxed at 100° C. for two and one-half hours, during which period the water distills out and the solution becomes biscous, and orange-brown in color. The temperature is then raised and heating is continued at 170° C. for two and one-half hours and then at 190° C. for seventeen hours, yielding an orange-brown resinous material, 2.26 g. It is insoluble in water, but readily soluble in dimethylacetamide, forming a yellow solution. The product softens at 110° C. and melts completely at 128° C., giving a viscous, orange-brown melt. From the titration of the excess acid in the trap with standard sodium hydroxide (0.1198 N), it is found that 49% (0.00394 mole) of triethylamine still remains in the polymer.

The orange polymer is ground in a mortar with a pestle, reinserted in the polymerization tube and heated at 190° C. at 34 mm. Hg pressure for three hours. The resulting reddish-orange solid melts in the range of 130–135° C. and its intrinsic viscosity is found to be 0.120 dl./g. in dimethylacetamide at 20° C. Then heating of the reddish-orange solid is continued at 190° C. at 34 mm. Hg pressure for an additional seventeen hours, and there is obtained a brown solid which softens at 133° C. and melts completely at 175° C. The brown polymer is then heated at 190° C. for two hours at 760 mm. Hg and at 190° C./42 mm. Hg for three and one-half hours. During the heating at 42 mm. Hg foaming occurs. The resulting brick-brown polymer melts completely at 190° C. and has an intrinsic viscosity of 0.285 dl./g. in dimethylacetamide at 20° C. Then, heating of the polymer is continued at 190° C. under 25 mm. Hg for four hours. The polymer (2.1 g., 105%) is still soluble in dimethylacetamide and its intrinsic viscosity at this stage is 0.431 dl./g. in dimethylacetamide and 0.349 dl./g. in dimethylformamide at 20° C. The reaction is terminated at this time.

The infrared spectrum of the final polymer shows an intense $SO_2NH_2$ absorption at 1330 cm.$^{-1}$ and an intense $SO_2N$ absorption at 1170 cm.$^{-1}$. A sharp and intense absorption band at 1610 cm.$^{-1}$, characteristic of an amide carbonyl group is also present. The structure of the polymer at this stage appears to be mainly in the form shown above in Formula X with $n''$ greater than N'. The differential thermal analysis of the dimethylacetamide-soluble polymer shows a sharp endotherm at 584° C. and several broad endotherms in the region of 300° C. to 500° C.

EXAMPLE IX 6-aminosaccharin (1.9910 g., 0.0105 mole), triethyl amine (0.7539 g., 0.00746 mole), and water (2.029 g.) are placed in a polymerization tube. The tube is flushed with nitrogen and the mixture heated to 150° C. for two hours. During the course of the reaction water distills from the mixture, leaving a viscous, red-brown liquid. The temperature is increased then to 200° C. for twenty hours. There is obtained 2.03 g. (102%) of a brown solid. This polymer is found to have an intrinsic viscosity of 0.215 dl./g. in dimethlformamide at 20° C. An infrared spectrum is recorded. The polymer appears to have a structure of Formula X above in which $n'=3$ and $n''=7$.

EXAMPLE X 6-aminosaccharin (1.9925 g., 0.0107 mole) triethyl amine (0.7816 g., 0.00774 mole) and water (2.5132 g.) are placed in a polymerization tube. The tube is flushed with nitrogen and the mixture heated to 150° C. for two hours. During the reaction, water distills from the mixture leaving a red-brown, viscous liquid. The temperature is raised then to 200° C. and the effluent gas is passed through a trap containing hydrochloric acid (75.00 ml. 0.0974 m) and the heating is continued. At the end of the trap are titrated with sodium hydroxide (51.00 ml., 0.0611 M). There remains in the polymer mass 0.003535 mole (45.6%) of triethyl amine. The trap is replaced with one containing fresh hydrochloric acid (50.00 ml., 0.0974 M). and the heating is continued. At the end of forty-five hours, the heating is stopped and the contents of the trap are titrated with sodium hydroxide (68.60 ml., 0.0611 M). There remains in the polymer mass 0.00280 mole (36.1%) of triethyl amine. There is obtained 2.10 g. (102%) of a brown glassy solid. This polymer is found to have an intrinsic viscosity of 0.250 dl./g. in dimethylformamide at 20° C.

EXAMPLE XI (a) Melt polymerization of 6-amino saccharin at 325° C. for two hours 6-aminosaccharin (1.18 g., 0.06 mole) is placed in a polymerization tube. The tube is flushed with nitrogen and its contents heated at 325° C. for two hours. There is obtained 1.13 g. (96%) of a brown, glassy solid, intrinsic viscosity 0.162 dl./g. in dimethylformamide at 20° C. Carbon, hydrogen and nitrogen analyses indicate that the polymer has the structure shown above in Formula XII.

EXAMPLE XII

Melt polymerization of 6-aminosaccharin at 325° C. for varying periods 6-aminosaccharin (0.0015 mole) is placed in each of four polymerization tubes as follows: tube $a$, 0.2979 g.; tube $b$, 0.2995 g.; tube $c$, 0.2999 g.; and tube $d$, 0.2979 g. Each tube is evacuated for fifteen minutes and then reweighed. No significant weight loss occurs in any of the tubes. The tubes are then flushed with nitrogen by evacuating and filling three times with nitrogen. Then they are heated in a nitrogen atmosphere at 325° C. as follows: tube $a$ for sixty minutes; tube $b$ for forty-five minutes; tube $c$ for fifteen minutes; tube $d$ for thirty minutes. After cooling, the tubes are reweighed. The calculated weight losses are as follows: tube $a$, 0.0099 g.; tube $b$, 0.0139 g.; tube $c$, 0.0085 g.; and tube $d$, 0.0158 g. The samples are all brittle, glassy brown solids. The color became slightly darker as the heating time increased. The intrinsic viscosity of the polymer C is found to be 0.159 dl./g. in dimethyl formamide at 20° C. Carbon, hydrogen and nitrogen analyses indicate that this polymer also has the structure shown above in Formula XII.

EXAMPLE XIII

Polymerization in polyphosphoric acid

A mixture of 6-aminosaccharin (2.0 g., 0.01 mole) and 80.0 g. of polyphosphoric acid is placed in a 250 ml. three-neck, round-bottom flask equipped with a gas inlet tube, an outlet tube, a thermometer and a mechanical stirrer. The yellow mixture is heated from room temperature to 155° C. within three and one-half hours, then this temperature is maintained for nineteen hours. During this heating period, the color of the yellow mixture turns gradually from brownish white to deep purple. Samples are withdrawn at the end of two-hour, seven-hour, twelve-hour and nineteen-hour periods. Each withdrawn sample is quenched over crushed ice, and the resulting mixture neutralized with concentrated ammonium hydroxide. In each case, only a very small amount of a fluffy material is isolated.

The temperature of the reaction mixture is then raised to 175° C. and the mixture heated at that temperature for six hours. After quenching in ice there is obtained only a small amount of insoluble material which is difficult to isolate because it adheres tenaciously to the filter paper.

The mixture is then heated at 175–180° C. for fifty hours, during which time the color of the mixture turns gradually from purple to dark green, then to dark brown. Samples are withdrawn at the end of seven-hour, fourteen-hour, twenty-four-hour, thirty-six-hour, and forty-eight hour periods. On mixing each sample with cold methanol, a fluffy polymer precipitated, which is isolated by filtration and washed with large amounts of methanol. During the course of heating, the solubility of the polymer in dimethylacetamide decreases with time, although some solubility, at least in concentrated sulfuric acid, is maintained. The dried, fluffy, dark-brown polymer isolated at the end of the forty-eight hours period is insoluble in dimethylacetamide and somewhat soluble in concentrated sulfuric acid.

The remaining portion of the mixture is then heated at 185–190° C. for twenty hours. After precipitation with methanol, as described above, the polymer is obtained in the form of a fluffy black material. It was insoluble in dimethylacetamide, but very slightly soluble in concentrated sulfuric acid. Its infrared spectrum is quite simple and shows a broad $SO_2N$ absorption at 1180 cm.$^{-1}$, indicating that a substantial amount of ring closure had occurred.

| Temperature, ° C. | Time, hours | $[\eta]$ in conc. $H_2SO_4$ (dl./g.) |
|---|---|---|
| 175–180 | 24 | 0.055 |
| 175–180 | 36 | 0.072 |
| 175–180 | 48 | 0.075 |

EXAMPLE XIV

Polymerization of the 4-aminosulfobenzoic anhydride

One-half of the 4-aminosulfobenzoic anhydride filtrate (a) obtained in Example VII is distilled at 50–55° C./1 mm. Hg to remove the dimethylacetamide, and there is obtained a viscous, greenish-yellow liquid (a). The viscous, greenish-yellow residue (a) is placed in a polymerization tube and heated at 160° C. under a nitrogen atomsphere for one-half hour, at 180° C. for one-half hour, and then at 220° C. for nineteen hours. The residue becomes brown and then finally dark-brown to black. The black material (b) is still water and dimethylacetamide-soluble. It has an intrinsic viscosity of 0.134 dl./g. in dimethylacetamide at 20° C. From the result of the titration, the black material (b) appears to have a repeating unit with the structure shown in Formula XIII with the ratio of cyclic to open repeating units being about 10 to 1. Titration of this soluble black material (b) with standard sodium hydroxide solution is followed by means of a pH meter. Addition of base gives an immediate increase in pH followed by a slow return towards the pH of the solution before the addition of base. This behavior is typical of polymeric materials.

Its infrared spectrum, as a potassium bromide disc, shows an intense $SO_2N$ absorption at 1180 cm.$^{-1}$, but $SO_3H$ asborptions at 1240 cm.$^{-1}$ and 1080 cm.$^{-1}$ diminish considerably when compared with the infrared of the product (b) from Example VII. An absorption due to amide I and amide II bands is still present. A new absorption band due to amide III appears at 1310 cm.$^{-1}$, and N–H out-of-plane deformation (amide V) at 702 cm.$^{-1}$, disappears.

The black material (b) is ground to a brown-colored powder, and when heated at 300° C. for forty minutes under a nitrogen stream, it foams and emits a gas with an unpleasant odor. The foamed black material is still soluble in water and dimethylacetamide. When it is heated at 300° C. for one and one-half hours, the material is only slightly soluble in either water or dimethylacetamide. On raising the temperature to 320° C. for one hour, there is obtained a brittle, black material (c) which is no longer soluble in water or dimethyl-acetamide. The infrared spectrum of the final polymer (c) in potassium bromide shows an intense, sharp amide carbonyl absorption at 1610 cm.$^{-1}$, but $SO_3H$ absorption at 1080 cm.$^{-1}$ disappears almost completely.

The infrared spectra of the soluble materials show an amide carbonyl (amide I) in the 1600 cm.$^{-1}$ region, which is shifted to 1620 cm.$^{-1}$ (possibly an imide carbonyl) in the spectrum of the insoluble material (c). The infrared spectrum of the insoluble material (c) shows only a shoulder at 1225 cm.$^{-1}$, but there is no absorption at 1080 cm.$^{-1}$ (both regions are characteristics for $SO_3H$ group). The $SO_2$–N absorption is very strong. This indicates that the repeating units of insoluble material (c) are mainly in the cyclic imide form.

EXAMPLE XV (1) Post-heating of hemi-polymers at 350° C. for one hour

The hemi-polymer (0.6216 g., intrinsic viscosity 0.431) of Example VIII is placed in a polymerization tube. The tube is flushed with nitrogen and heated at 350° C. for one hour under a slow stream of nitrogen, and an amine-like odor is noted in the nitrogen exit gas. There is obtained 0.5681 g. (91.0%) of a black solid. The polymer is slightly soluble in dimethylacetamide and very soluble in concentrated sulfuric acid. This polymer shows no weight loss up to 400° C. in nitrogen, a 16% loss at 600° C., and a 37% loss at 1100° C. by thermogravimetric analysis.

(2) Post-heating at 400° C. for one hour

The hemi-polymer (0.4597 g., intrinsic viscosity 0.431) of Example VIII is heated at 400° C. for one hour according to the method described above. Evolution of amine gas is noted and there is obtained 0.336 g. (73%) of a black solid which is insoluble in dimethylacetamide but slightly soluble in concentrated sulfuric acid. This polymer shows no weight loss up to 450° C. in nitrogen, only a 10% weight loss at 600° C., and a 32% loss at 1100° C. by thermogravimetric analysis.

(3) Post-heating at 400° C. for one hour and 420° C. for three hours

The post-heated, black polymer (0.1119 g.), obtained by the procedure of preceding paragraph (2) is heated at 420° C. for three hours under a slow stream of nitrogen and the evolution of amine is noted. There is obtained an insoluble black solid (a) in 86% yield (0.0966 g.). The polymer is insoluble in both dimethylacetamide and concentrated sulfuric acid. This polymer (a) shows no weight loss up to 450° C. in nitrogen, only a 7% weight loss at 600° C., and a 31% loss at 1100° C. by thermogravimetric analysis. When the polymer heated to 1100° C. in nitrogen in the thermogravimetric apparatus is recycled under nitrogen, there is otbained a substantially linear plot of weight versus temperature. When the polymer is heat-treated to 1100° C. and recycled in air it shows no weight loss up to 410° C., a 26% loss at 600° C. and a total loss at 750° C.

The dimethylacetamide-insoluble, black polymer (a) of the preceding paragraph is also subjected to thermogravimetric analysis in air and shows no weight loss up to 350° C., a 44% loss at 600° C. and a total loss at 730° C. A small amount of basic gas is evolved when the polymer (a) is heated around 500–700° C. in the thermogravimetric apparatus.

EXAMPLE XVI

Post-heating poly-6-aminosaccharin at 400° C. for one hour

Poly-6-aminosaccharin (intrinsic viscosity 0.215; 0.2 g.), prepared according to Example IX at 200° C. for twenty hours (using trimethyl amine catalyst) is placed in a polymerization tube. The tube is flushed with nitrogen and heated to 400° C. for one hour. Some obnoxious gas, related in odor to the thionylalkylamines, is evolved and there is obtained 0.19 g. (95%) of a black solid. This solid is insoluble in dimethylformamide.

This polymer shows no weight loss up to 450° C. in nitrogen, and shows only a 10% weight loss at 550° C. by thermogravimetric analysis.

EXAMPLE XVII

Post-heating of poly-6-aminosaccharin, prepared as a melt at 400° C. for one hour Poly-6-aminosaccharin, 1.31 g. (hemi-polymer prepared by the melt procedure of Example XI, intrinsic viscosity 0.162) is placed in a polymerization tube. The tube is flushed with nitrogen and heated to 400° C. for one hour. Some obnoxious gas, related in odor to thionylalkylamines, is evolved and there is obtained 1.18 g. (90%) of a black solid. This solid is insoluble in dimethylformamide.

*Analysis.*—Percent calculated for

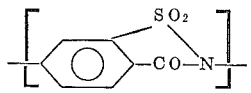

C, 46.41; H, 1.67; N, 7.73; S, 17.70. Found: C, 59.59; H, 3.28; N, 14.68; S, 12.62.

Percent calculated for $(C_{14}H_7N_3O_3S)_n$

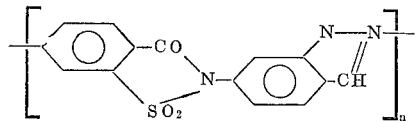

C, 56.58; H, 2.37; N, 14.14; S, 10.79. Found: C, 59.59; H, 3.28; N, 14.68; S, 12.62.

EXAMPLE XVIII

Preparation of 4-aminobenzenedisulfonyl anhydride

The procedure of Example I is used to replace the amino group of 2-sulfo-4-nitroaniline (prepared by sulfonation of 4-nitroaniline) with a sulfonamide group, and the resulting compound is converted to 4-nitrobenzenedisulfonyl anhydride by acidifying and refluxing with acetic anhydride as in Example VI. The recrystallized 4-nitrobenzenedisulfonyl anhydride (2.03 g., 0.00768 mole) in 15 ml. of dimethylacetamide is hydrogenated in the presence of 0.516 g. of 5% palladium-on-charcoal at 40 p.s.i.g. hydrogen pressure for one hour. The pressure drop is about 2 p.s.i.g. The black catalyst becomes grey, indicating some material is adsorbed on the catalyst.

The catalyst is removed by filtration, leaving a yellowish-orange solution.

A one-mil. portion of the solution is quenched with ice and stored in a refrigerator overnight. There is no precipitation. A one-ml. portion of the filtrate is mixed with about 10 ml. of acetone and there is obtained a flocculent white solid (a). Its infrared spectrum in potassium bromide shows $SO_3H$ absorptions at 1240 cm.$^{-1}$ and a shoulder due to $SO_2N$ absorption at 1190 cm.$^{-1}$. There is no $NO_2$ absorption band. Half of the solution is concentrated at 50° C./1 mm. Hg. There is obtained 0.25 g. of a pink solid (b) which softens at 195° C. and melts at 200–205° C. Its infrared spectrum in potassium bromide is similar to that of the solid (a).

The recovered catalyst is extracted with 10 ml. of dimethylacetamide three times at room temperature. The dark-brown extracts are combined and the dimethylacetamide is removed at 55° C./1 mm. Hg. There remains 0.8 g. of a purple solid (c). Its infrared spectrum is similar to that of (a). The purple solid had an intrinsic viscosity of 0.075 dl./g. in dimethylacetamide at 20° C.

EXAMPLE XIX

Polymerization of the reduction product of Example XVIII

The purple solid (0.7 g.) is heated at 220° C. for seventeen hours in a polymerization tube under a slow stream of nitrogen. There is obtained a shining black solid (a) which is still soluble in water and dimethylacetamide. The black solid (a) is found to have an intrinsic viscosity of 0.194 dl./g. in dimethylacetamide at 20° C. Its infrared spectrum in potassium bromide shows $SO_3H$ absorption at 1240 cm.$^{-1}$ and $SO_2N$ absorption at 1190 cm.$^{-1}$; both bands have about the same intensity. There is also present an intense absorption at 1620 cm.$^{-1}$ due to conjugated C=C.

Titration results indicate that the soluble black solid (a) is a mixture of structural units of Formula XV where $n':n''=20:1$.

The soluble black solid (a) is further heated at 300° C. for one and one-half hours under a slow stream of nitrogen and foaming is observed. The black product (b) is slightly soluble in water or dimethylacetamide. The temperature is raised to 320° C. and the black product (b) is heated at that temperature for one hour. The resulting black solid (c) is slightly soluble in water or dimethylacetamide. Then, the solid (c) is finally heated at 320° C. for another two hours. The final polymer is insoluble in water or dimethylacetamide. Its infrared spectrum is quite simple. There is an intense broad $SO_2$-N absorption at 1180 cm.$^{-1}$, whereas $SO_3H$ absorption at 1140 cm.$^{-1}$ becomes less sharp and less intense. The C=C absorption is shifted to 1580 cm.$^{-1}$.

EXAMPLE XX

The procedures of Examples XVIII and XIX are repeated using in place of the 4-nitrobenzenedisulfonyl anhydride, an equivalent amount of 4-nitronaphthalene-1,2-disulfonyl anhydride to give the corresponding reduced and polymerization products. Likewise when 4'-nitrodiphenyl-3,4-disulfonyl anhydride is used, corresponding results are obtained.

EXAMPLE XXI

The procedures of Examples I–III are repeated to prepare 5-aminosaccharin by starting with 2-Me-4-$NO_2$-benzenesulfonamide instead of 2-Me-5-$NO_2$-benzenesulfonamide. The 5-$NH_2$-saccharin product is a yellow solid having a melting point of 291–293° C. (Literature reports M.P. of 291–293° C.). When this product is heated above its melting point, or in a trimethylamine-water mixture, or in polyphosphoric acid, it undergoes polymerizations similar to 6-aminosaccharin.

EXAMPLE XXII

Individual polymerizations are effected successively according to the procedures of Examples VIII–XIII using an equivalent weight of each of the following monomers respectfully:

(a) 2-sulfo-4-aminobenzoic acid;
(b) The diamide of 2-sulfo-4-aminobenzoic acid;
(c) 4-amino-1,2-benzene disulfonamide;
(d) 5-amino-1,2-naphthalenedisulfonamide;
(e) 3-sulfo-5-amino-2-naphthoic acid;
(f) The dimethyl ester of 2-sulfo-5-amino-1-naphthoic acid;
(g) 5-amino-1,2-naphthalenedisulfonimide;
(h) 4-(p-aminophenyl)-2-sulfo-benzoic acid;
(i) 4-(p-aminophenoxy)-2-sulfo-benzoic acid;
(j) 4-(p-aminophenylthio)-2-sulfo-benzoic acid imide;
(k) 4-(p-aminophenylamino)-1,2-benzenedisulfonimide;
(l) N-phenyl-6-aminosaccharin;
(m) The dicyclohexyl ester of 5-amino-2,3-naphthalenedisulfonic acid;
(n) 4-(p-aminophenylacyl)-1,2-benzenedisulfonic acid;
(o) 4-(p-aminophenylsulfoxyl)-1,2-benzenedisulfonic acid;
(p) 4-aminophenylacyl)-2-sulfobenzoic acid;
(q) 4-(p-aminophenylmethyl)-2-sulfobenzoic acid;
(r) 4-(p-aminophenylmethyl)-1,2-benzenedisulfonic acid;
(s) 4-(p-aminophenylsulfonyl)-1,2-benzenedisulfonic acid;
(t) 3-amino-8-sulfo-1-naphthoic acid;
(u) 4-amino-8-sulfo-1-naphthoic acid; and
(v) 5-amino-1,8-naphthalene disulfonic acid.

The various monomers described above can be used in mixtures of two or more to give a polymer having a variety of repeating units of the type defined herein.

While it has been specified that the functional groups must be positioned ortho to each other on the aromatic nucleus it is intended that "ortho positioned" with respect to naphthalene embraces the "peri" positions since the actual distance between peri positions is such as to permit ring closure to form a 6-membered ring. Hence naphthalene compounds in which the sulfonyl and carboxyl or two sulfonyl radicals are attached to the 1,8 positions or 4,5 positions are suitable for the practice of this invention, for example, 4-amino-8-sulfo-1-naphthoic acid, 5-amino-1,8-naphthalene disulfonic acid, etc. can be used very satisfactorily.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A polymer capable of withstanding temperatures of from 500° to 1000° C. consisting essentially of repeating units having the structure:

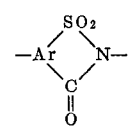

wherein Ar represents a trivalent carbocyclic aromatic radical having the valencies to which the $SO_2$ and C=O radicals are attached positioned ortho or peri to each other on the aromatic nucleus, 2. The polymer of claim 1 in which the intrinsic viscosity in concentrated sulfuric acid is at least 0.055 dl./g.

3. A polymer of claim 1 in which said Ar is

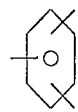

4. A polymer capable of withstanding temperatures of from 500° to 1000° C. consisting essentially of repeating units having the structure:

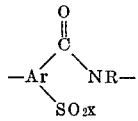

wherein Ar represents a trivalent, carbocyclic aromatic radical having the valencies to which the $SO_2$ and C=O radicals are attached positioned ortho or peri to each other on the aromatic nucleus;

x is a radical selected from the group consisting of —OR, —Cl, —Br, —NHR, and —ONa; and R is a radical selected from the group consisting of hydrogen and a hydrocarbon radical of no more than ten carbon atoms.

5. The process of preparing a polymer capable of withstanding temperatures of from 500° to 1000° C. which comprises heating to a temperature above its melting point a compound having the formula:

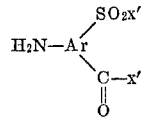

wherein Ar represents a trivalent, carbocyclic aromatic radical having the valencies to which the —$SO_2x'$ and

radicals are attached positioned ortho or peri to each other on the aromatic nucleus;

x' is a radical selected from the group consisting of —OR, —Cl, —Br, —NHR, and —ONa; and R is a radical selected from the group consisting of hydrogen and a hydrocarbon radical of no more than ten carbon atoms.

6. The process of claim 5 in which said Ar is

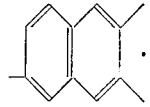

7. The process of claim 5 in which said compound is 6-aminosaccharin.

8. The process of claim 5 in which said compound is 5-aminosaccharin.

9. The process of claim 5 in which said compound is 4-amino-sulfobenzoic anhydride.

10. The process of claim 5 in which said compound is 3-sulfo-5-amino-betanaphthoic acid.

11. The process of claim 5 in which said heating step is effected while said compound is in intimate contact with polyphosphoric acid.

12. The process of claim 5 in which said heating step is effected while said compound is in intimate contact with dimethylacetamide.

13. The process of claim 5 in which said compound is 6-aminosaccharin and said compound is heated to a temperature of at least 400° C.

14. The process of claim 5 in which said compound is 5-aminosaccharin and said compound is heated to a temperature of at least 400° C.

15. The process of claim 5 in which said compound is 4-amino-8-sulfo-1-naphthoic anhydride.

References Cited
UNITED STATES PATENTS

| | | | |
|---|---|---|---|
| 3,110,701 | 11/1963 | Wear | 260—78 |
| 3,142,662 | 7/1964 | Huffman | 260—78 |
| 3,184,436 | 5/1965 | Magot | 260—78 |

HAROLD D. ANDERSON, Primary Examiner

U.S. Cl. X.R.

117—161; 161—227; 260—79.3, 47, 63, 32.6, 30.8, 29.2, 2.5